United States Patent [19]

Holdridge

[11] 4,344,673
[45] Aug. 17, 1982

[54] FOCUSING REFLECTOR

[75] Inventor: David W. Holdridge, Fullerton, Calif.

[73] Assignee: Swedlow, Inc., Garden Grove, Calif.

[21] Appl. No.: 192,431

[22] Filed: Sep. 29, 1980

[51] Int. Cl.³ .............................................. G02B 5/08
[52] U.S. Cl. .................................... 350/292; 350/103;
350/299; 126/439
[58] Field of Search ............... 350/102, 103, 286, 292,
350/299; 126/438, 439

[56] References Cited

U.S. PATENT DOCUMENTS

| 2,682,807 | 7/1954 | Onksen | 350/103 |
| 4,120,565 | 10/1978 | Rabl et al. | 350/292 X |
| 4,160,577 | 7/1979 | Berg | 350/292 X |

Primary Examiner—F. L. Evans
Attorney, Agent, or Firm—Fulwider, Patton, Rieber, Lee & Utecht

[57] ABSTRACT

A focusing reflector comprises a sheet of transparent material such as acrylic or the like formed to have a smooth-surfaced upper face and a lower face with a modified corner cube geometry. The modified corner cube geometry includes a plurality of multifaceted reflective elements arranged in a hexagonal close pack relationship with each element being defined by three planar facets forming a pyramid-shaped structure. Each element has two of its facets oriented mutually perpendicularly, and the third facet is oriented with respect to the perpendicular facets at a predetermined angle other than ninety degrees for redirection of light incident upon the upper sheet face toward a prescribed focal zone. The angular orientation of the third facet of each element is a function of the location of the element with respect to the position of the focal zone, together with the desired size and shape of the focal zone.

19 Claims, 8 Drawing Figures

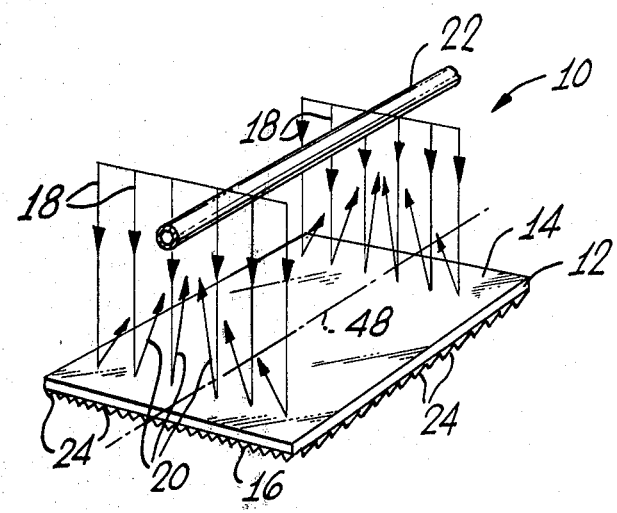
Fig.1
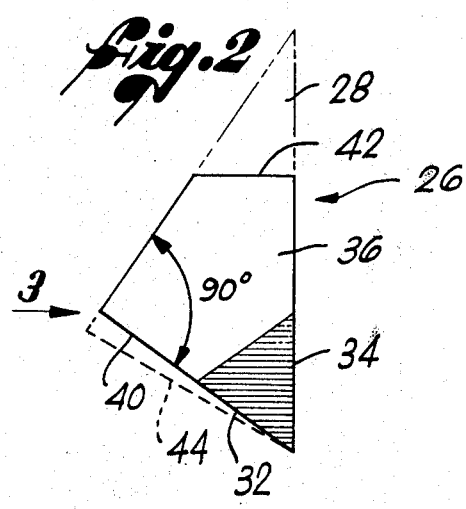
Fig.2
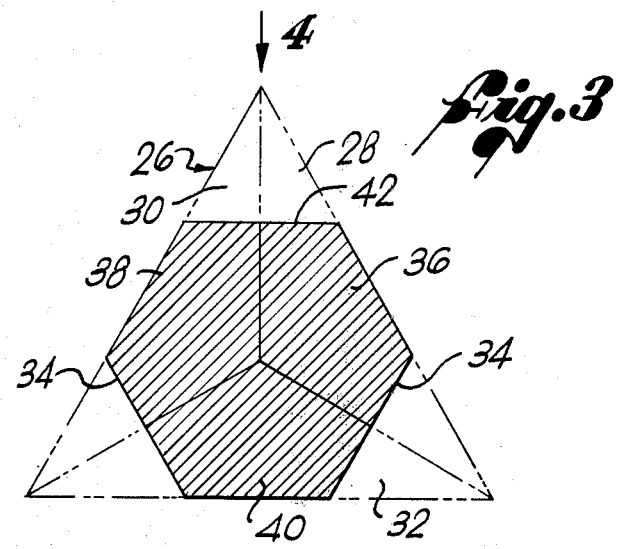
Fig.3
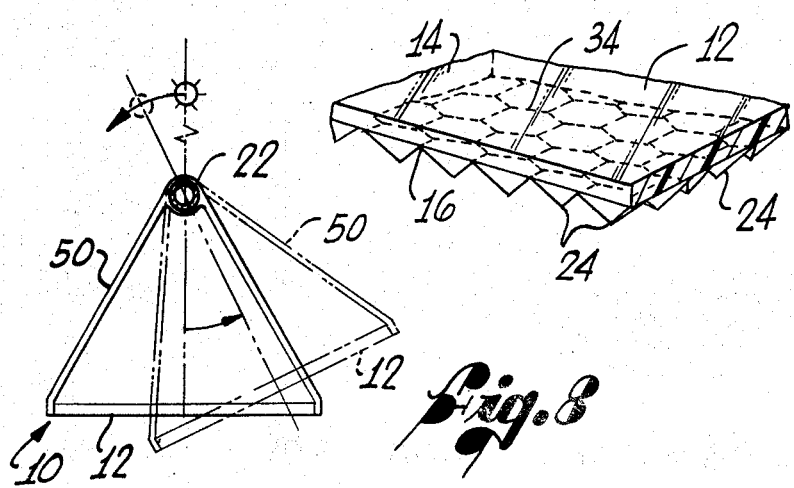
Fig.5
Fig.8

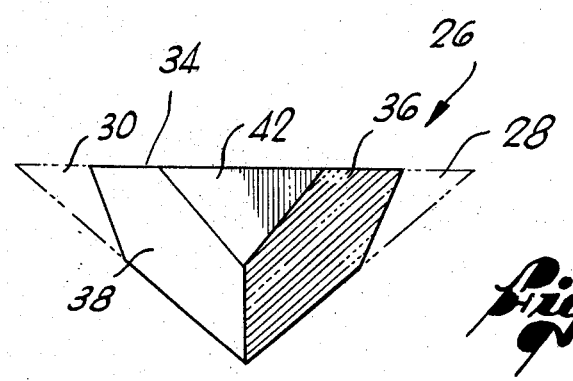
*fig.4*
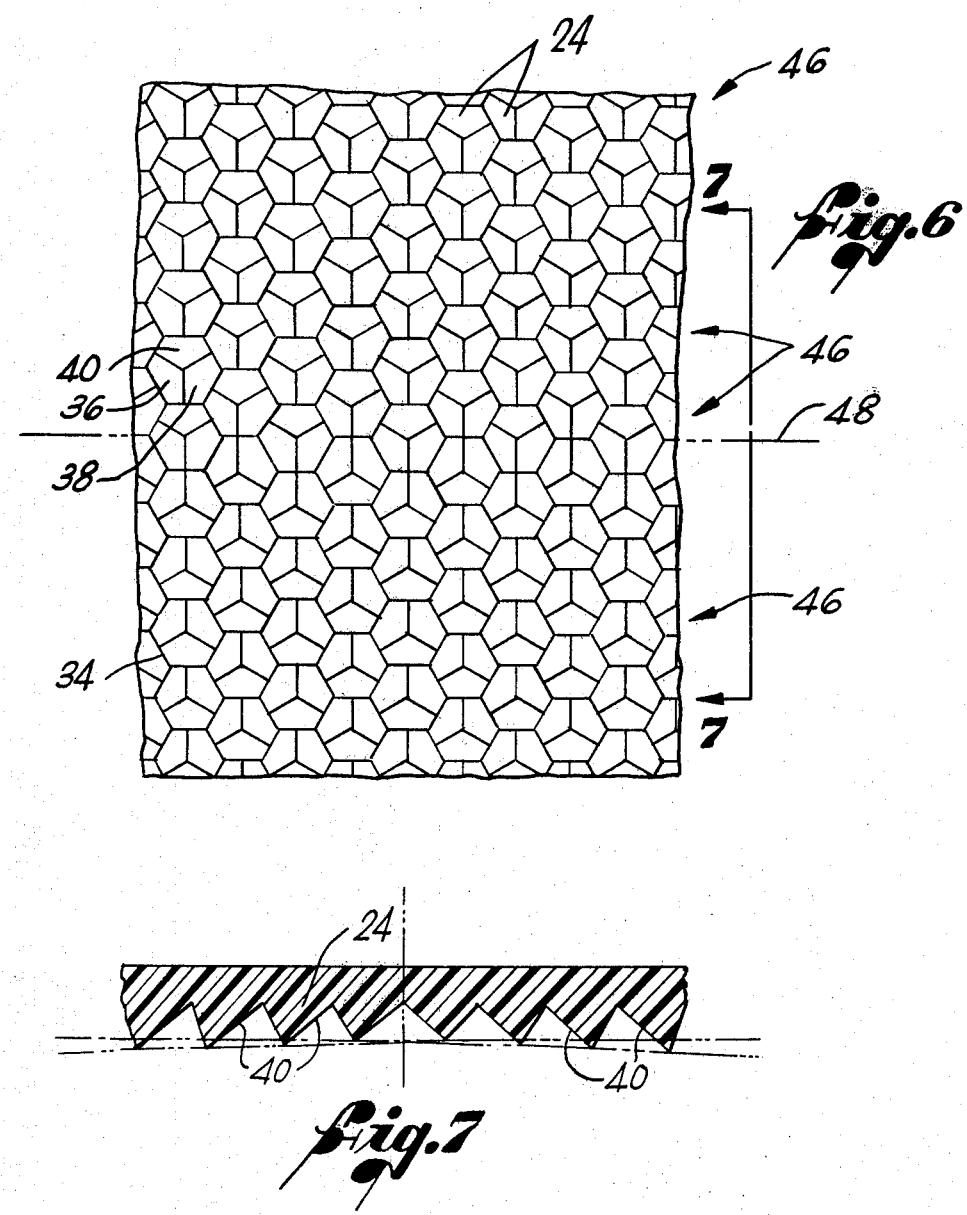
*fig.6*
*fig.7*

FOCUSING REFLECTOR

BACKGROUND OF THE INVENTION

This invention relates to reflector devices for focusing and concentrating incident light. More specifically, this invention relates to a relatively simple and inexpensive focusing reflector for redirecting incident light for concentration at a prescribed focal zone, wherein the reflective surfaces of the reflector comprise a modified corner cube geometry.

A variety of reflector devices are available in the prior art for focusing and concentrating incident light. For example, parabolic mirrors are known for focusing light incident upon the mirror at a precise focal zone. In solar energy applications, a parabolic mirror is advantageously used to reflect the sun's rays for concentration upon heat pipes, photocells, and the like at the focal zone for converting the concentrated solar energy to a more useful form. However, parabolic mirrors are relatively difficult and expensive to design and construct in that each mirror must be formed according to a precise parabolic geometry for satisfactory reflection and focusing of the incident light. Moreover, the parabolic mirror must be supported by a rigid structural framework for maintaining the parabolic geometry of the mirror, and this entire framework must be precisely oriented with respect to the light source for satisfactory concentration of the light energy. In solar applications, this results in a relatively complex and expensive system which must be accurately and gradually shifted in position according to the season and time of day.

The prior art further includes a large number of relatively simple and inexpensive reflector devices, such as plain mirrors and the like, which are capable of reflecting incident light with high efficiency. However, these traditional reflector devices are not useful in solar energy applications in that they typically reflect the incident light without concentration at an angle complementary to the angle of incidence. Other reflector devices such as conventional corner cube reflectors have been provided with an array of corners cubes each having three mutually perpendicular facets for redirecting incident light back toward the light source throughout a range of angles of incidence. While these corner cube devices have broad applicability in the automobile and bicycle safety reflector lens field, they too are not useful in solar energy applications because of their failure to concentrate the redirected light at a predetermined focal zone.

It is desirable, therefore, to provide a reflector device for reflecting and concentrating incident light energy wherein that reflector device is relatively inexpensive in design and manufacture, and does not require precision tracking of the light source for efficient operation. The present invention provides such an improved and inexpensive focusing reflector device.

SUMMARY OF THE INVENTION

In accordance with the invention, a focusing reflector is provided for reflecting and concentrating incident light energy to a prescribed focal zone. The reflector is formed from a relatively inexpensive and lightweight transparent sheet material, such as acrylic, to have a smooth-surfaced upper face presented toward the incident light rays. The reflector sheet includes a lower face formed to define a modified corner cube geometry for angularly redirecting the incident light rays for concentration at the focal zone.

The modified corner cube geometry comprises an array of downwardly depending multifaceted reflective elements arranged in a hexagonal close pack relationship. Each element is defined by three planar facets forming a generally pyramid-shaped structure. Two of the facets comprise reflector facets formed perpendicular to each other, and the third facet comprises a focusing facet positioned with respect to the reflector facets at a predetermined angle other than ninety degrees. The specific angle of the focusing facet for each element together with the orientation of each element within the array are selected so that each element reflects the incident light to the prescribed focal zone.

In the preferred embodiment of the invention, the reflector comprises a rectangular reflector sheet of the transparent material, and this sheet is associated with a linear receiver such as a heat absorbing pipe positioned centrally above the reflector sheet in parallel alignment with a centerline of the sheet. The array of reflective element comprises a plurality of rows of the elements on the lower face of the sheet with each row extending in parallel with the sheet centerline. Each element within the array is oriented with its focusing facet lying in a plane generally parallel with the sheet centerline and thereby also in parallel with the linear receiver. Moreover, each of the focusing facets is angularly positioned with respect to its associated reflector facets according to its lateral spacing from the sheet centerline to cause the element to redirect the incident light to the receiver. Accordingly, the angular orientation of the focusing facets progressively changes with each row of the reflective elements, with the precise angular orientation of the focusing facets being dependent upon the location and size of the linear receiver with respect to the sheet centerline.

In a solar energy application, the focusing reflector can be fixed in position with the receiver centrally overlying the reflector sheet when the sun is directly overhead. The receiver is then positionally adjusted without altering the position of the reflector sheet in accordance with changes in sun angle to follow shifts in position of the focal zone resulting from an alteration of the angle of incidence of the sunlight. Alternately, if desired, the receiver can be fixed in position whereby the reflector sheet is angularly shifted with respect to the receiver in accordance with the sun angle.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view illustrating operation of a focusing reflector of this invention;

FIG. 2 is a simplified diagram illustrating a multifaceted reflective element for use with the focusing reflector of FIG. 1;

FIG. 3 is a plan view of the reflective element of FIG. 2, taken on the line 3—3 of FIG. 2;

FIG. 4 is an elevational view of the reflective element, taken on the line 4—4 of FIG. 3;

FIG. 5 is an enlarged fragmented perspective view showing a portion of the focusing reflector of FIG. 1;

FIG. 6 is an enlarged fragmented bottom plan view of a portion of the focusing reflector of FIG. 1;

FIG. 7 is an enlarged fragmented and simplified vertical section taken on the line 7—7 of FIG. 6; and FIG. 8 is a schematic diagram illustrating an alternate embodiment of the invention.

DETAILED DESCRIPTION OF THE PREFERRED EMBODIMENT

As illustrated in FIG. 1, a focusing reflector 10 of this invention generally comprises a planar reflector sheet 12 of a transparent material such as a cast sheet of acrylic or the like. The planar reflector sheet 12 has a smooth-surfaced upper face 14 and a lower face 16 formed to define a modified corner cube geometry. Light rays 18 emanating from a light source, such as the sun, are incident upon the upper face 14 of the reflector sheet 12 for transmission through the transparent sheet 12 to the lower face 16. The modified corner cube geometry of the lower face 16 serves to reflect the incident rays back through the sheet 12 for concentration and focusing, as illustrated by the reflected light rays 20, at a prescribed focal zone occupied, for example, by a linear receiver 22. The receiver 22 comprises a suitable heat transfer device such as a black heat absorbing pipe for carrying circulating water or the like and for transferring the absorbed concentrated light energy to the water in the form of heat energy. Alternately, it is to be understood that the receiver 22 may comprise any of a wide variety of photoelectric or photothermal devices for use in converting the reflected and concentrated light energy to a more useful form, such as heat energy, electrical energy, and the like.

The focusing reflector 10 of this invention provides a substantial improvement over focusing reflector devices available in the prior art in that the reflector 10 can be formed inexpensively by high volume molding and/or casting techniques from relatively inexpensive and readily available lightweight plastic materials such as acrylic. According to the invention, the reflector's lower face 16 is formed to have a modified corner cube geometry for redirection and focusing of incident light to be receiver 22, as opposed to a conventional corner cube reflector which serves to redirect the incident light angularly back toward the light source throughout a range of incidence angles. The reflector 10 is thus useful, for example, in solar energy installations for providing relatively lightweight and inexpensive apparatus for collecting and concentrating solar radiation. With the reflector 10 of this invention, rigid structural frameworks and precision tracking equipment of the type required with prior art parabolic mirrors are avoided, whereby the reflector 10 can be adapted for a variety of large and small solar energy installations without substantial capital expenditure.

The modified corner cube geometry of the lower face 16 of the reflector sheet 12 comprises a closely packed array of downwardly depending individual multifaceted reflective elements 24. Each element 24 within the array is geometrically tailored to redirect light incident upon the sheet upper face 14 and transmitted downwardly through the sheet 12 back toward to the prescribed focal zone which, in FIG. 1, is occupied by the receiver 22. Because the elements 24 within the array are positioned at different distances from the focal zone and the receiver 22, the specific tailored geometry of each element 24 differs according to its respective location within the array.

The reflective element geometry is illustrated in FIGS. 2-4, with reference to a conventional corner cube geometry. More specifically, as illustrated, each corner cube comprises a portion of a generally pyramid-shaped corner of a truncated corner cube 26. This truncated cube 26 includes three identical facets 28, 30, and 32 each having the same triangular shape and disposed perpendicularly with respect to the other two facets of the corner cube 26. When an array of the corner cubes 26 each comprising the three mutually perpendicular triangular facets 28, 30, and 32 is formed on the rear face of a transparent reflector sheet, a conventional corner cube geometry results. This conventional corner cube geometry is effective to reflect incident light back toward the light source throughout a range of incidence angles, and reflectors utilizing such a geometry are well known in the automotive and bicycle safety reflector lens field.

In a conventional corner cube geometry as illustrated best in FIG. 3, each corner cube within an array of cubes can be truncated to define a hexagonal base 34 for each cube. With this configuration, the cube comprises three mutually perpendicular facets 36, 38 and 40 of generally pentagonal shape and separated from each other by relatively small vertical side faces 42. This hexagonal base configuration for the cube is advantageous since the conventional cube with triangular facets 28, 30, and 32 is known to reflect only that portion of the light which is incident upon a hexagonal central region of the cube, as illustrated by the shaded portion of FIG. 3, with the light incident upon other portions of the cube being lost. Accordingly, when the cube is truncated to define the hexagonal base 34 with the pentagonal facets 36, 38, and 40, and a plurality of such cubes are arrayed on a transparent reflector sheet in a so-called hexagonal close-pack relationship, the resultant reflector is effective to reflect substantially all of the light incident thereon. Once again, when the facets 36, 38, and 40 are arranged mutually perpendicularly, a hexagonal closepack array of cubes is effective to reflect incident light back toward the light source throughout a range of angles of incidence.

In the modified corner cube geometry of this invention, each reflective element 24 is formed to have the three pentagonal facets 36, 38, and 40 depending angularly downwardly from the hexagonal base 34, and a plurality of such elements 24 are arrayed in a hexagonal close-pack relation to reflect substantially all of the incident light. However, according to the invention, two of the facets 36 and 38 comprise reflector facets positioned perpendicular to each other, and the third facet 40 comprises a focusing facet positioned at an angle other than ninety degrees with respect to the two reflector facets 36 and 38. This non-perpendicular orientation of the focusing facet 40 is illustrated by the dotted line 44 in FIG. 2.

The reflector facets 36 and 38 cooperate with the focusing facet 40 to reflect incident light at an angle with respect to the angle of incidence of the light. The angle of reflection is a direct function of the angular deviation of the focusing facet 40 from the conventional perpendicular geometry with respect to the reflector facets 36 and 38. For example, when the angular relationship between the focusing facet 40 with the reflector facets 36 and 38 is modified to eighty-nine degrees, and thus provide an angular deviation of one degree, the angle of reflection of the light is two degrees with respect to angle of incidence.

The reflective elements 24 each including the reflector facets 36 and 38 and the focusing facet 40 are arranged in a plurality of parallel rows 46 on the lower face 16 of the reflector sheet 12, as shown in FIGS. 6-7. These rows 46 of the elements 24 are aligned in parallel with an imaginary centerline 48 of the sheet 12, with adjacent elements 24 of adjacent rows 46 being offset with respect to each other in a hexagonal close-pack relation. This centerline 48 is in parallel alignment with the linear receiver 22 disposed centrally above the sheet 12, as shown in FIG. 1.

The focusing facet 40 of each element 24 is oriented on the side of the associated cube opposite the centerline 48 and in a plane generally in parallel with the centerline 48 of the sheet, and thus also in parallel with the linear receiver 22. More specifically, as shown best in FIGS. 6 and 7, the elements 24 within the rows 46 on opposite sides of the centerline 48 are each oriented with their focusing facets lying in planes parallel with the centerline 48 and their reflector facets lying in planes extending angularly away from the centerline. With this arrangement, the focusing facets 40 of each row 46 are positioned at the same distance below and laterally to one side of the focal zone defined by the linear receiver 22, whereby said focusing facets 40 of each particular row are tailored uniformly at an appropriate angle with respect to the reflector facets 36 and 38 to reflect incident light to the receiver 22. Alternately, if desired, the elements 24 can be oriented with their focusing facets 40 presented toward the centerline 48 and in parallel therewith, in which case the focusing facets 40 are angularly tailored at an appropriate angle greater than ninety degrees instead of less than ninety degrees.

By way of example, as illustrated in FIG. 7, the size and position of the linear receiver 22 with respect to the sheet 12 and the elements 24 can be chosen so that the rows 46 of elements immediately adjacent opposite sides of the centerline 48 require the focusing facets 40 of those rows 46 to reflect incident normal light at an angle of two degrees for the reflected light to strike the receiver. In this instance, the focusing facets 40 of the elements 24 in these rows 46 are angularly tailored at eighty-nine degrees with respect to the associated reflector facets 36 and 38. Moreover, assuming that each successive row of the elements 24 in a direction laterally away from the centerline 48 requires reflection of normal incident light at an angle increased by two degrees for each row, then the focusing facets 40 of each successive row are tailored as described above at an angle diminishing by one degree for each row in order to focus and concentrate the incident light upon the receiver 22. This progressive alteration in the angular tailoring of the focusing facets 40 is shown clearly in exaggerated form in FIG. 7. Of course, the specific angular tailoring of each focusing facet 40 in the array of elements 24 is chosen according to the size and location of the receiver 22, and the position of each element 24 with respect to the receiver.

The array of reflective elements 24 in the modified corner cube geometry of this invention can be formed by a variety of techniques including, for example, an iterative technique. With this technique, an element array is formed with progressively changing angles of the focusing facets 40 as a function of the distance from the centerline 48, and the array is tested to ascertain the accuracy of focusing of the incident light energy. Appropriate alterations in the angles of the focusing facets are made and the process is repeated until the desired focusing and concentration characteristics are obtained. The resultant focusing reflector then can be used to form a master die for use in mass production of the reflector 10 of this invention from an inexpensive and lightweight material, such as acrylic plastic.

The focusing reflector 10 shown in FIG. 1 is quickly and easily adapted for use in solar energy applications wherein the light source, namely, the sun, moves with respect to the reflector 10 in accordance with the time of day and the season. In such an application, the movement of the solar light source causes a corresponding displacement of the focal zone of the reflector 10, since the focusing elements 24 are geometried to redirect incident light at a known angle related to the angle of incidence. By mounting the receiver 22 upon suitable framework (not shown), and by movably positioning the receiver 22 to follow the focal zone of the reflector as a function of season and time of day, the receiver 22 can be positioned for receiving the concentrated light energy without requiring continuous movement of the reflector 10 along with the receiver. Alternately, as viewed in FIG. 8, the receiver 22 can be fixed in position with the reflector 10 mounted upon a suitable time-responsive framework 50 for altering the position of the receiver so that the focal zone remains at the position of the receiver.

A variety of modifications and improvements to the focusing reflector described herein are believed to be possible to one skilled in the art. For example, the reflective element array may be arranged in a circular pattern about a central point, and the angle of the focusing facet of each reflective element may be appropriately altered according to the distance from the center of the circular array whereupon the elements are designed to reflect the incident light to a focal point, instead of along a linear focal zone as illustrated in FIG. 1. Accordingly, no limitation on the invention is intended, except as set forth in the appended claims.

I claim:

1. A focusing reflector for redirecting light from a light source to a prescribed focal zone, comprising:
   a reflector sheet formed from a transparent material and having a generally smooth-surfaced upper face for presentation toward the light source, and a lower face; and
   a plurality of downwardly depending reflective elements formed on said lower face, each of said elements having a pair of reflector facets oriented perpendicular to each other and a focusing facet oriented with respect to said reflector facets at a preselected angle other than ninety degrees for cooperating with said reflector facets to reflect light incident upon said upper face to the prescribed focal zone.

2. The focusing reflector of claim 1 wherein said sheet and said elements are of unitary construction.

3. The focusing reflector of claim 2 wherein said sheet and said elements are formed from an acrylic plastic.

4. The focusing reflector of claim 1 wherein said plurality of elements are arranged on said lower face of said sheet in a hexagonal close-pack array.

5. The focusing reflector of claim 1 wherein said focusing facet of each of said elements is oriented with respect to its associated reflector facets at an angle chosen according to the size and location of the focal zone and the position of said each element on said sheet.

6. The focusing reflector of claim 1 wherein the focal zone comprises a linear receiver vertically overlying said sheet, said plurality of elements being arranged in a plurality of rows each extending generally in parallel with the receiver, and wherein said focusing facets of said elements are oriented in planes generally parallel with said receiver.

7. The focusing reflector of claim 6 wherein said focusing facets of said elements of one of said rows are oriented at the same angle with respect to their associated reflector facets, and wherein said angular orientation of said focusing facets of said elements of adjacent rows is different.

8. The focusing reflector of claim 7 wherein the angular orientation of said focusing facets of said elements progressively changes with each successive one of said rows as a function of the distance of said rows from said receiver.

9. A focusing reflector for redirecting light form a light source to a prescribed focal zone, comprising:
a reflector sheet formed from a transparent material and having an upper face with a generally smooth surface for presentation toward the light source, and a lower face defined by an array of downwardly depending reflective elements each having a pair of reflector facets oriented substantially perpendicular to each other and a focusing facet oriented with respect to said reflector facets at a preselected angle for cooperating with said reflector facets to reflect light incident upon said upper face to the prescribed focal zone, said angular orientation of said focusing facets of adjacent ones of said elements changing progressively with changes in the distance of said elements from the focal zone.

10. The focusing reflector of claim 9 wherein said plurality of elements are arranged on said lower face of said sheet in a hexagonal close-pack array.

11. The focusing reflector of claim 9 wherein each of said elements comprises a generally pyramid-shaped structure.

12. The focusing reflector of claim 9 wherein the focal zone comprises a linear receiver vertically overlying said sheet, said plurality of elements being arranged in a plurality of rows each extending generally in parallel with the receiver, and wherein said focusing facets of said elements are oriented in planes generally parallel with said receiver.

13. The focusing reflector of claim 12 wherein said focusing facets of said elements of one of said rows are oriented at the same angle with respect to their associated reflector facets.

14. A focusing reflector for redirecting light from a light source to a prescribed focal zone, comprising:
a reflector sheet formed from a transparent material and having a generally smooth-surfaced upper face for presentation toward the light source, and a lower face;
a plurality of rows of downwardly depending reflective elements formed on said lower face, each of said elements having a pair of reflector facets oriented perpendicular to each other and a focusing facet oriented with respect to said reflector facets at a preselected angle for cooperating with said reflector facets to reflect light incident upon said upper face to the prescribed focal zone, said angular orientation of said focusing facets of one of said rows being identical to each other and different from said angular orientation of said focusing facets of an adjacent one of said rows.

15. The focusing reflector of claim 14 wherein said plurality of elements are arranged on said lower face of said sheet in a hexagonal close-pack array.

16. The focusing reflector of claim 14 wherein the focal zone comprises a linear receiver vertically overlying said sheet, and wherein said rows are formed generally in parallel with said receiver with said focusing facets each being disposed in planes generally in parallel with said receiver.

17. The focusing reflector of claim 16 wherein said angular orientation of said focusing facets in adjacent ones of said rows changes progressively with changes in the distance of said rows from the receiver.

18. In combination with an elongated receiver for receiving concentrated light energy, a focusing reflector for redirecting light from a light source to the receiver, comprising:
a reflector sheet formed from a transparent material and having a lower face and a generally smooth-surfaced upper face for presentation toward the light source and the receiver; and
a plurality of elongated rows of downwardly depending reflective elements formed on said lower face, each of said rows extending generally in parallel with said receiver, each of said elements having a pair of reflector facets oriented perpendicular to each other in planes extending angularly with respect to the receiver, and a focusing facet oriented in a plane generally parallel with the receiver and angularly with respect to said reflector facets at a preselected angle for cooperation with said reflector facets to reflect light incident upon said upper face to the receiver, said angular orientation of said focusing facets within each row being identical to each other and changing progressively between adjacent rows as a function of the distance of said rows from the receiver.

19. The focusing reflector of claim 18 wherein said plurality of elements are arranged on said lower face of said sheet in a hexagonal close-pack array.

* * * * *